US012564889B2

(12) United States Patent
　　　Carbone

(10) Patent No.: US 12,564,889 B2
(45) Date of Patent: Mar. 3, 2026

(54) CUTTING ACCESSORY FOR A DRILL

(71) Applicant: 9492-3521 Inc., Montreal (CA)

(72) Inventor: Marco Carbone, Montreal (CA)

(73) Assignee: 9492-3521 Inc., Montreal (CA)

( * ) Notice: Subject to any disclaimer, the term of this patent is extended or adjusted under 35 U.S.C. 154(b) by 0 days.

(21) Appl. No.: 18/291,087

(22) PCT Filed: May 17, 2023

(86) PCT No.: PCT/CA2023/050680
§ 371 (c)(1),
(2) Date: Jan. 22, 2024

(87) PCT Pub. No.: WO2023/220822
PCT Pub. Date: Nov. 23, 2023

(65) Prior Publication Data
US 2025/0065421 A1　　Feb. 27, 2025

Related U.S. Application Data

(60) Provisional application No. 63/343,124, filed on May 18, 2022.

(51) Int. Cl.
B23B 51/05　　　　(2006.01)
(52) U.S. Cl.
CPC ........ B23B 51/05 (2013.01); B23B 2260/058 (2013.01); B23B 2260/136 (2013.01)
(58) Field of Classification Search
CPC .............. B23B 51/05; B23B 2260/058; B23B 2260/136; B23B 2226/57; B23B 51/04
See application file for complete search history.

(56) References Cited

U.S. PATENT DOCUMENTS

| | | | | |
|---|---|---|---|---|
| 1,365,660 | A | * | 1/1921 | Collier ................ B23B 51/0453 |
| | | | | 408/112 |
| 2,482,439 | A | * | 9/1949 | Smith ................. B23B 51/0473 |
| | | | | 279/127 |
| 3,771,895 | A | * | 11/1973 | Meyer .................... B23B 51/05 |
| | | | | 408/157 |
| 4,295,763 | A | * | 10/1981 | Cunniff .................. B27G 13/16 |
| | | | | 408/172 |
| 5,292,210 | A | * | 3/1994 | Nowick ............. B23Q 11/0053 |
| | | | | 408/67 |
| 6,120,220 | A | * | 9/2000 | Speare .................... B23B 51/05 |
| | | | | 408/209 |
| 6,171,032 | B1 | * | 1/2001 | Forche ................... B23B 51/05 |
| | | | | 408/67 |

(Continued)

FOREIGN PATENT DOCUMENTS

DE　　　　4420999　　　12/1995

*Primary Examiner* — Steven A Macdonald
(74) *Attorney, Agent, or Firm* — Philip A. Swain; Ryan W. Dupuis; Equinox IP Inc.

(57) ABSTRACT

A sawing accessory for a drill, which includes a cutting member that is connected to the drill for axial rotation about an axis of rotation. The cutting member has a plate and two or more blades connected to the plate. The blades depend from the plate. The blades are curved inwardly towards the axis of rotation. A spring arrangement interconnects the blades and is connected to the cutting member. The cutting member is configured such that a rotational cutting force which is applied to a workpiece sheet creates a curved cut in the sheet.

19 Claims, 6 Drawing Sheets

(56)             References Cited

U.S. PATENT DOCUMENTS

| | | | |
|---|---|---|---|
| 6,457,915 B1 * | 10/2002 | Kao | B23Q 11/0053 |
| | | | 408/67 |
| 6,599,063 B1 | 7/2003 | Capstran | |
| 6,786,684 B1 | 9/2004 | Ecker | |
| 7,967,535 B2 | 6/2011 | Eiserer et al. | |
| 8,221,037 B2 * | 7/2012 | Neitzell | B23B 51/0426 |
| | | | 408/206 |
| 8,827,604 B1 | 9/2014 | Corey | |
| 2002/0106254 A1 * | 8/2002 | Rudolph | B23B 51/04 |
| | | | 408/206 |
| 2003/0077138 A1 * | 4/2003 | Alm | B23B 51/04 |
| | | | 408/241 R |
| 2014/0180414 A1 * | 6/2014 | Pfeiffer | A61B 17/1613 |
| | | | 623/16.11 |
| 2015/0174670 A1 * | 6/2015 | Steele | B23B 51/05 |
| | | | 408/36 |
| 2018/0193926 A1 | 7/2018 | Sawa et al. | |
| 2021/0146454 A1 * | 5/2021 | Forsell | B23B 51/04 |

* cited by examiner

CUTTING ACCESSORY FOR A DRILL

CROSS-REFERENCE TO RELATED APPLICATIONS

This application is a national phase filing of PCT/CA2023/050680 and claims priority from U.S. Provisional Application Ser. No. 63/343,124 filed May 18, 2022,the entire contents of which are hereby incorporated by reference.

TECHNICAL FIELD

The present generally concerns a cutting accessory for a drill, and in particular a cutting accessory for cutting a shaped opening in a workpiece sheet.

BACKGROUND

Plaster board (also known as "gypsum rock" or "gyprock") or indeed any material is used in construction to create walls and ceilings, or to cover an open space. It is generally easy to install by mounting on studs. The board is relatively easy to cut because the gypsum is sandwiched between two layers of heavy-duty paper. If light switches, ceiling light fittings or fixtures are needed, or an existing repair needs to be carried out, a workman generally uses a hand-held drill to which is attached a saw accessory. For various ceiling fixtures, the opening needed to be cut in the plaster board is circular. Conventional saws are designed as a circular cup-shape with a circular saw connected to a circular plate. The circular saw cuts through the board and creates an inner sidewall in the cut which is go degrees relative to the plane of the board. While this is quick and easy, replacing the removed piece (or "puck") is difficult. Typically, the workman needs to locate an anchoring system on the blind side of the board and then screws or bolts are needed to then secure the removed piece of plasterboard. To complete the job in an aesthetic manner, the workman then needs to cover the screws and then cover the cut by applying paper or mesh tape, followed by multiple layers of plaster. Several skimming layers are then needed to ensure a smooth finish.

The inventor is aware of a number of designs which are available to cut holes in workpiece sheets. One in particular is U.S. Pat. No. 5,800,148 to Wise for "Blind-Taper Hole Saw" ("Wise'). While this design appears to address some of the problems, it has a number of significant drawbacks. The Wise design is a blind-taper hole saw in which the blades are oriented in divergent fashion. The cutting blades are also linear/straight. Wise's spring appears to be a coiled spring that appears to be coaxial with a shank or shaft of the cutter.

Wise's tool tapers from a smaller circumference to a larger circumference from the user's point of view. This would translate into a concave hole saw which starts with a large circumference and ends with a smaller circumference from the user's point of view. Disadvantageously, this arrangement of blades would create a cut and a puck which could not be removed from the user side or front side. This would be difficult if not impossible to remove without damaging wall or the puck. Of course, the puck is typically reused to refill the hole once the job is complete.

Thus, there is a need for a drill accessory which can quickly and easily cut through a workpiece sheet and create a puck that is easy to remove and replace when necessary.

BRIEF SUMMARY

We have significantly reduced, or essentially eliminated, the problems associated with the above by designing a hole cutting sawing in which the blades are curved inwards towards the longitudinal axis of the drill bit. Advantageously, this permits the user to cut and remove a puck in which the outer sidewalls of the removed puck are curved and cooperate with the cut sidewalls of the workpiece sheet. This significantly reduces, or essentially eliminates, the need for screws and other means of attachment once the work exterior to the hole has been done. The user embeds the puck and drywall with plaster (also known as "mud"). This ensures adhesion between the puck and the wall, and thereafter merely skims the edges using plaster or any other acceptable material known to those skilled in the art. Given the nature of the cut, it is also possible to replace the puck using an interference fit. An outer cup (or "shell") is provided which significantly reduces the amount of dust that is aerosolized during a cutting operation.

Accordingly, in one embodiment there is provided a sawing accessory for a drill, comprising:
- a cutting member connected to the drill for axial rotation about an axis of rotation, the cutting member having a plate and at least two blades connected to the plate and depending away therefrom, the blades being inwardly curved towards the axis of rotation; and
- a resilient member interconnecting the blades, the resilient member being connected to the cutting member, the cutting member being configured such that a rotational cutting force being applied to a workpiece sheet creates a curved cut into the sheet.

In one example, the resilient member is configured such that the blade tips move towards the axis of rotation when the blades cut through the workpiece sheet. The resilient member is a W-shaped spring. The resilient member is configured to reposition the blades during a cutting operation, when the cutting force is applied, and a removal operation, when the cutting member is removed from the workpiece sheet.

In one example, the curved cut is circular hole with sidewalls that are generally frustoconical when viewed in cross section. A generally frustoconical-shaped puck is removed from the workpiece sheet, the puck being sized and shaped to be cooperable with the circular hole.

In another example, an elongate shaft connects the cutting member to the drill, the elongate shaft includes a drill bit end and a cutting member end.

In one example, the cutting member includes four blades.

In another example, the cutting member is mounted in a cup, the cup being sized and shaped to collect particulate matter during the cutting step.

In yet another example, the workpiece sheet is a gyprock sheet, an asphalt sheet, a plywood sheet or a Styrofoam sheet. The workpiece sheet is a gyprock sheet or a plywood sheet.

Accordingly, in another embodiment there is provided a saw accessory for a drill for cutting a circular hole in a workpiece sheet, the accessory comprising:
- a cutting member connected to the drill for axial rotation about an axis of rotation, the cutting member having a plate and a plurality of blades connected to the plate and depending downwardly therefrom, the blades being inwardly curved towards the axis of rotation;
- a resilient member interconnecting the blades, the resilient member being connected to the cutting member; and
- a cup connected to the drill, the cup being disposed around the cutting member, the cup having a cup sidewall, the cup sidewall being curved inwardly towards the axis of rotation, the cutting member being configured such that a rotational cutting force being applied to the workpiece sheet creates a curved cut into the sheet.

Accordingly, in another embodiment there is provided a saw accessory for a drill for cutting a circular hole in a workpiece sheet, the accessory comprising:

a cutting member connected to the drill for axial rotation about an axis of rotation, the cutting member having a plate and a plurality of blades connected to the plate and depending downwardly therefrom, the blades being inwardly curved towards the axis of rotation; and a cup connected to the drill, the cup being disposed around the cutting member, the cup having a cup sidewall, the cup sidewall being curved inwardly towards the axis of rotation, the cutting member being configured such that a rotational cutting force being applied to the workpiece sheet creates a curved cut into the sheet, the cup having a seal located around the cup end to sealingly contact the workpiece sheet to stop dust and particulate material.

In another example, the workpiece sheet is a gyprock sheet, an asphalt sheet, a plywood sheet or a Styrofoam sheet. The workpiece sheet is a gyprock sheet or a plywood sheet.

In another example, each blade includes an elongate, centrally located, semi-circular rectangular opening therein. Each blade includes a flat plate having two holes therein.

BRIEF DESCRIPTION OF THE DRAWINGS

These and other features of that described herein will become more apparent from the following description in which reference is made to the appended drawings wherein.

DETAILED DESCRIPTION

Definitions

Unless otherwise specified, the following definitions apply:

The singular forms "a", "an" and "the" include corresponding plural references unless the context clearly dictates otherwise.

As used herein, the term "comprising" is intended to mean that the list of elements following the word "comprising" are required or mandatory but that other elements are optional and may or may not be present.

As used herein, the term "consisting of" is intended to mean including and limited to whatever follows the phrase "consisting of". Thus, the phrase "consisting of" indicates that the listed elements are required or mandatory and that no other elements may be present.

Figure 1:
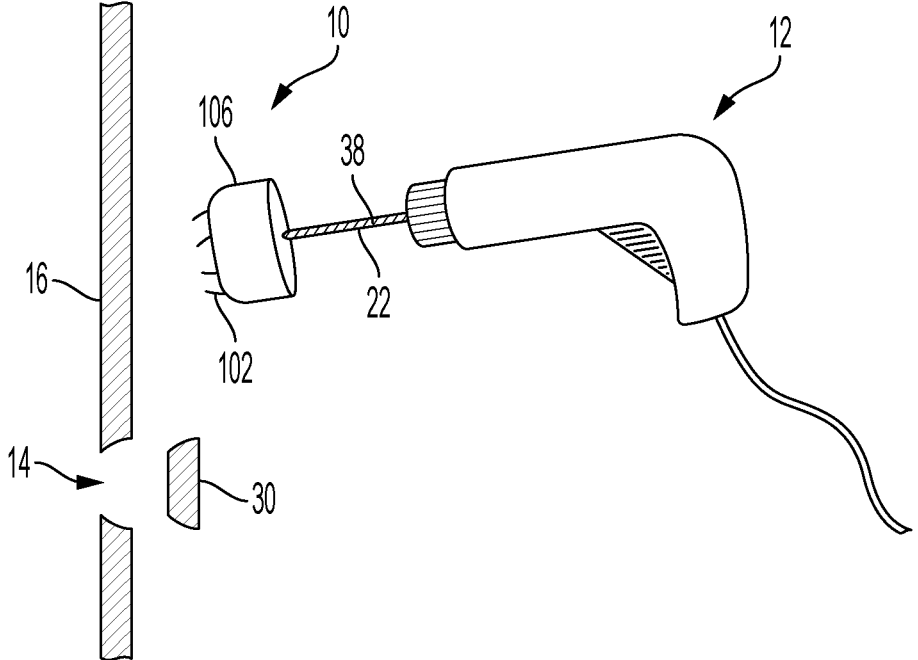
FIG. 1 is a perspective view of an embodiment of a cutting accessory for use with a hand-held drill.

Referring now to FIG. 1, there is shown generally at 10 a saw accessory for use with a handheld drill 12. The handheld drill 12 is known to those skilled in the art and may be either a battery-operated model or a corded model. Typically, the drill 12 is sufficiently lightweight to permit a user to use the drill for long periods of time, often in awkward work spaces such as in ceilings and adjacent corners of a room. Generally speaking, the drill 12 is used to create circular "holes" 14 in a workpiece sheet 16. The workpiece sheet 16 is typically plasterboard, which is also known as "gyprock" and is used to construct walls and ceilings in the interior of a building such as a house or office. Gyprock is lightweight and easy to install. Another example of the workpiece sheet 16 is a plywood sheet. In other examples, the workpiece sheet is an asphalt sheet or a Styrofoam sheet.

However, the problem arises when fixtures such as those found in ceilings, for example, light fixtures, fans, and the like, need to be installed, as well as during a remodelling project.

We designed the taper hole saw to address the many changes that can occur during a remodel or renovation. Furthermore, the taper hole saw can be used on both gyprock and plywood, or indeed any of the workpiece materials described herein. Typically, both materials have thicknesses of for example, but not limited to, ⅛ inch, ¼ inch, ½ inch, ⅝ inch, ¾ inch.

Figure 2:
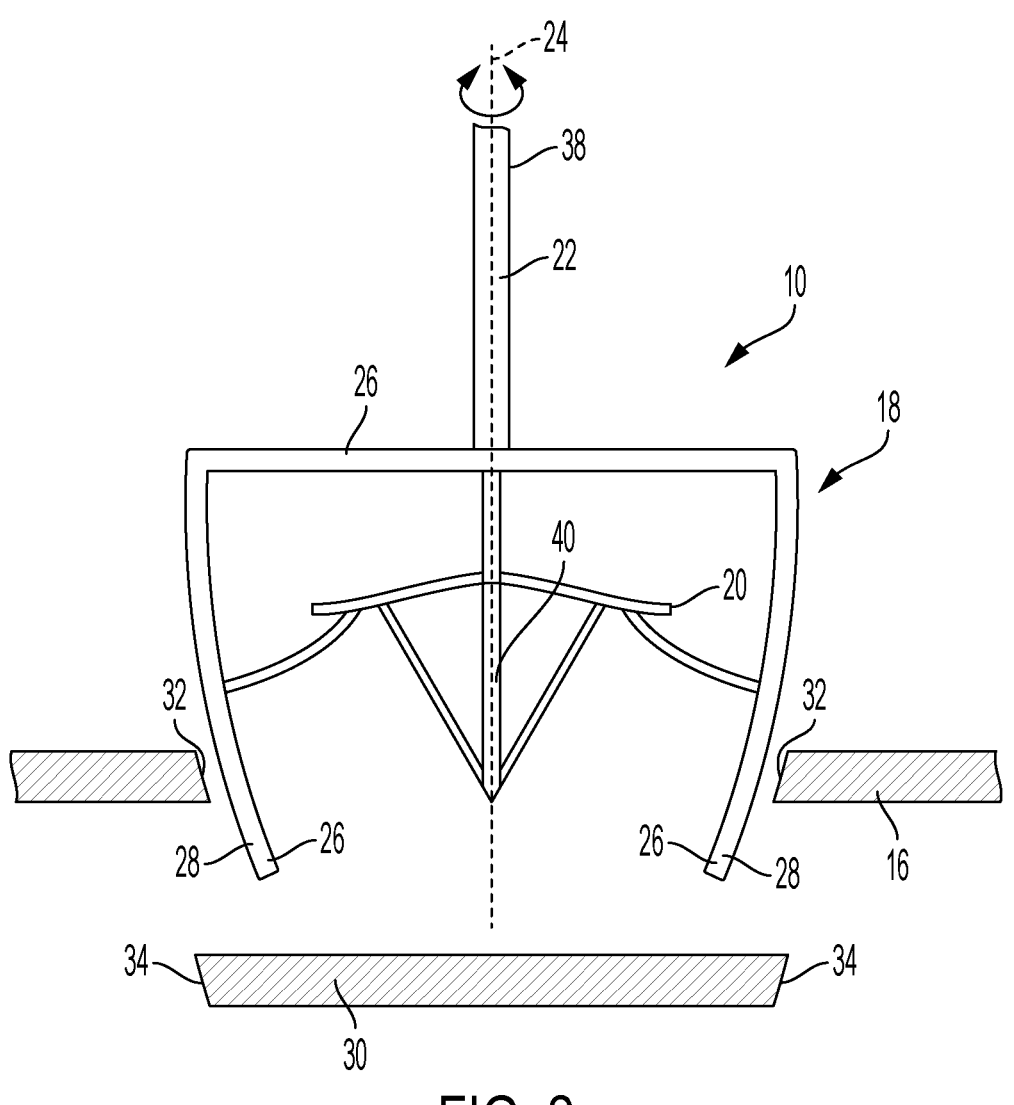
FIG. 2 is a cross sectional view of the cutting accessory showing inwardly curved blades and the generation of curved sidewalls in a workpiece sheet.

Referring now to FIG. 2, the saw accessory 10 includes a cutting member 18 and a resilient member 20. The cutting member 18 is connected to the drill 12 via a drill bit shaft 22, which is connected to the drill 12 for axial rotation about a longitudinal axis 24, The cutting member 18 includes a plate 26 and at least two blades 28 that are connected to the plate 26. The blades 28 are configured to depend downwardly and away from the plate 26. To permit an angled and curved cut in the workpiece sheet 16, the blades 28 are inwardly curved towards the longitudinal axis of rotation 24. A person of ordinary skill in the art will readily recognize that the diameter of the cutting member 18 and thus the puck is ready for use. Generally speaking, the puck can be of any size, however, that depends on the unit itself. The unit (taper hole saw) can provide a fixed diameter every time, but cannot change the diameter unless another unit is created or used. Currently a 4⅛" unit is functional.

Still referring to FIG. 2, the resilient member 20 interconnects the blades 28, the resilient member is connected to the cutting member 18. The cutting member 18 is configured so that a rotational cutting force, which is applied to the workpiece sheet imparts a curved cut into the sheet 16. More specifically, the resilient member 20 is configured such that each blade tip 26 moves towards the axis of rotation 24 when the blades 28 cut through the workpiece sheet 16. The resilient member 20 is a W-shaped spring, which is configured to reposition the blades 28 during a cutting operation, when the cutting force is applied against the workpiece sheet 16. To remove the cutting member and a reverse removal operation is engaged such that the cutting member is removed from the workpiece sheet and a puck 30 is removed.

The curved cut is circular hole with sidewalls 32 that are generally frustoconical when viewed in cross section. The generally frustoconical-shaped puck 30 is removed from the workpiece sheet 16. The puck 30 sized and shaped to be cooperable with the circular hole because the puck 30 includes puck sidewalls 34 that register with the sidewalls 32.

As best seen in FIGS. 1 and 2, the drill bit shaft 22 connects the cutting member 18 to the drill 12. The elongate shaft 22 includes a drill bit end 38 and a cutting member end 40.

During operation, the cutting member 18 creates a linear pathway while simultaneously digging and cutting through the gyprock material. This creates an inward angular path while digging through the gyprock material.

Figure 3:
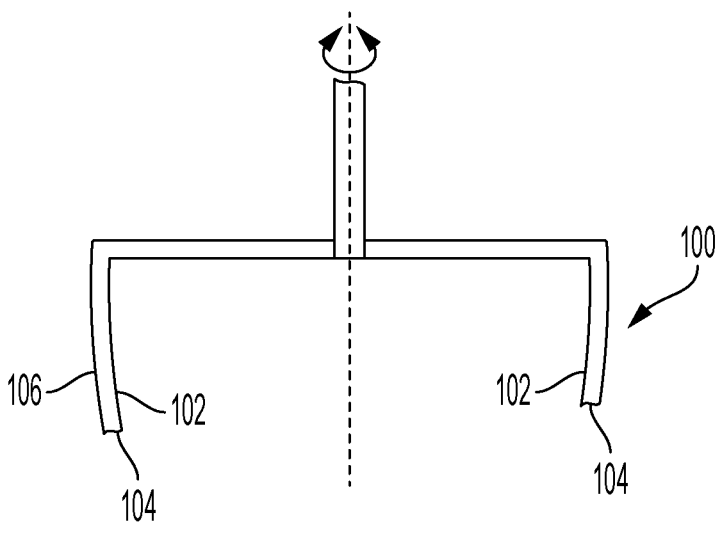
FIG. 3 is a cross sectional view of another embodiment of a cutting accessory showing inwardly curved cutting blades located inside an inwardly curved holding cup.
Figure 4:
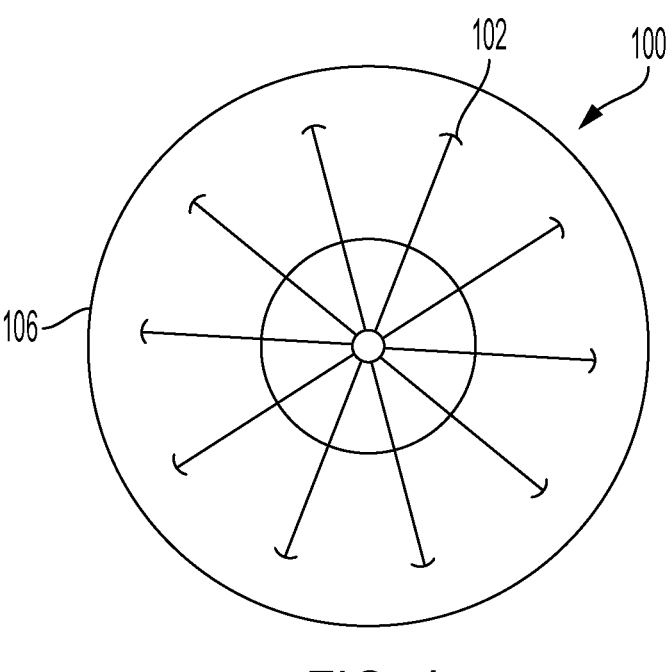
FIG. 4 is a worm's eye view of a cutting member showing a plurality of blades located inside a cup.

Referring now to FIGS. 3 and 4, a second embodiment of a cutting accessory is shown generally at 100. In this accessory, essentially the same principles as the first embodiment 10 apply. The cutting accessory 100 has more advantages over the cutting accessory 10 in that there are more safety features that can be added.

Referring to FIGS. 3. 5 and 5A, to ensure a cleaner and more aligned cut, the second embodiment 100 includes four or more blades 102. In the example shown, each of the blades 102 is slightly curved towards a blade tip 104. A curved housing (a cup) or a straight housing 106 is used to house the plurality of blades 102 so that they axially rotate inside the cup 106. The cup 106 helps to maintain the blades 102 in a stable, aligned configuration while cutting through the workpiece sheet 16. Furthermore, the cup 106 acts as a dust and particulate matter collector. This significantly reduces the amount of aerosolized dust in the work area. The cutting member includes four blades. Also, since the blades 102 rotate at high speed during a cutting operation, the use of the cup 106 reduces the risk of injury to the workman's hands and fingers.

Figure 5:
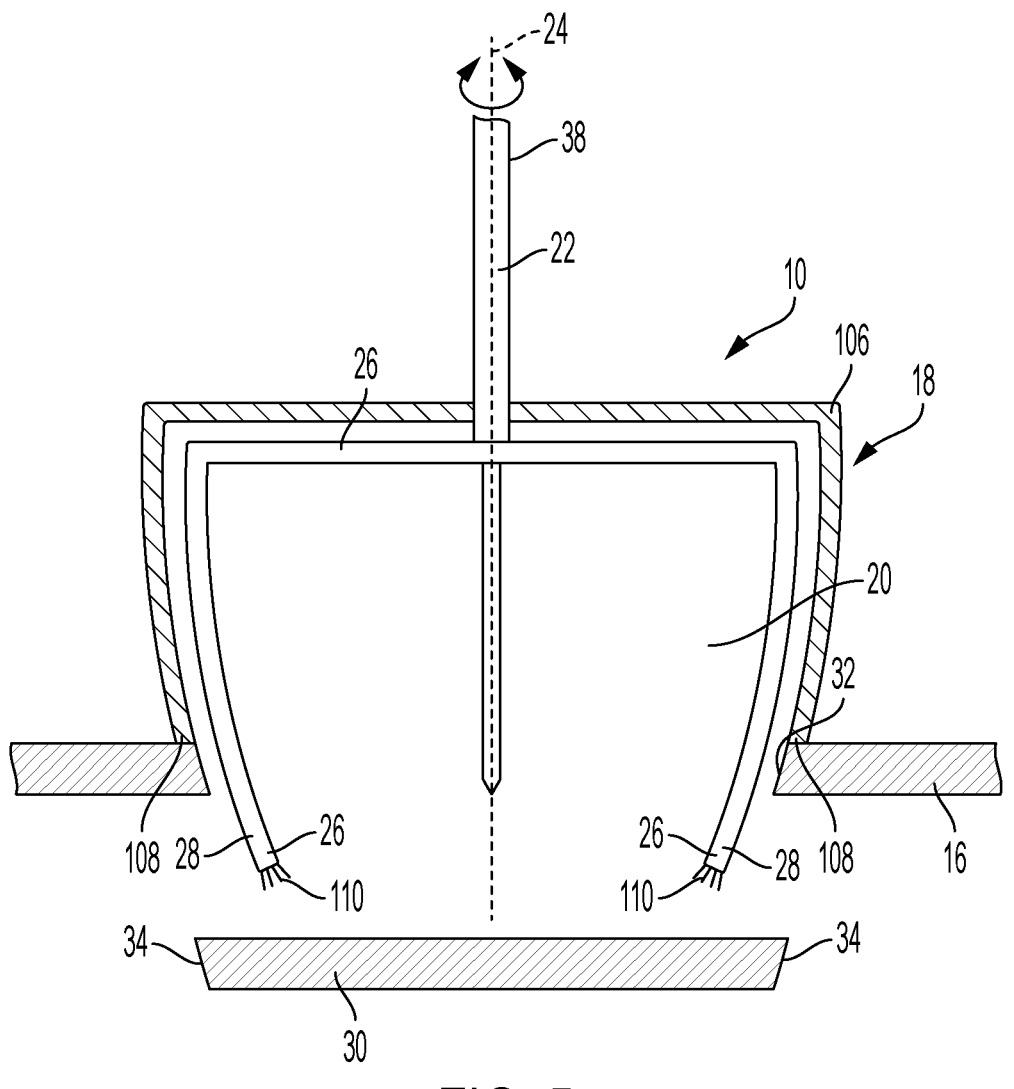
FIG. 5 is a cross sectional view of the cutting accessory showing a curved cup surrounding inwardly curved blades and in sealing contact with the workpiece sheet.
Figure 5A:
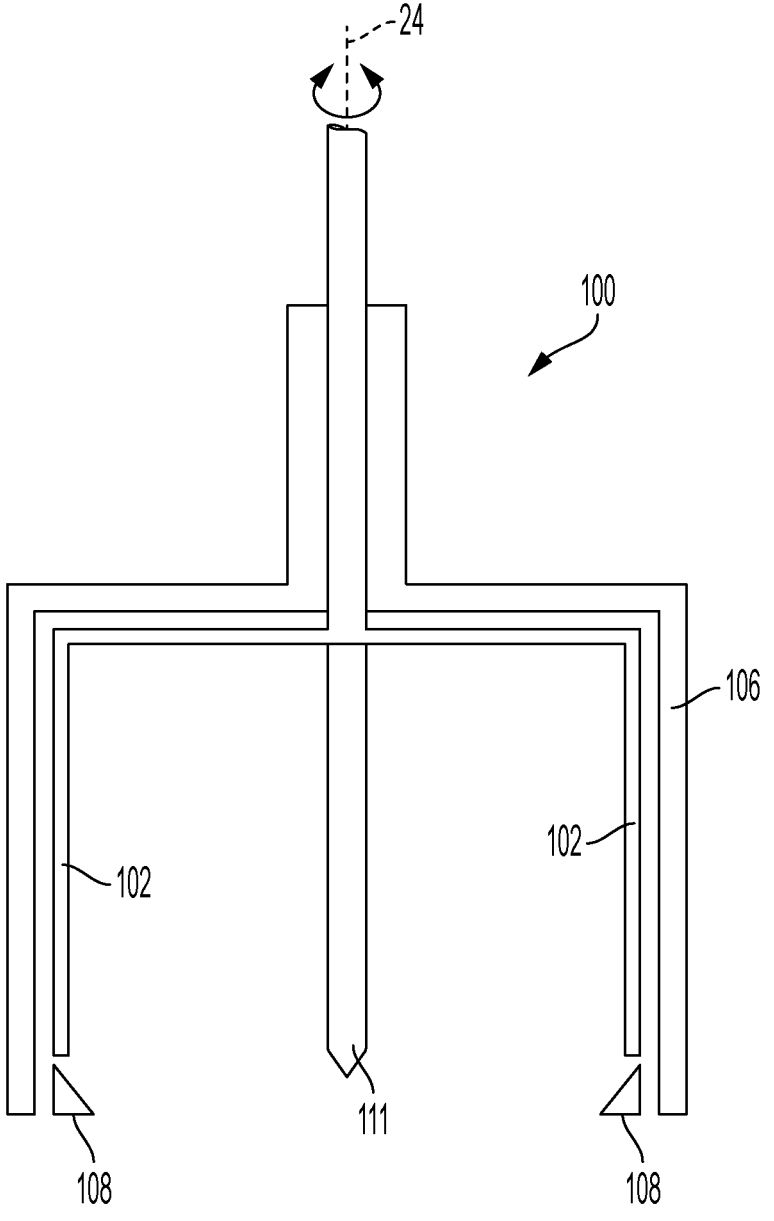
FIG. 5A is a cross sectional view of the cutting accessory showing a straight cup surrounding inwardly curved blades and in sealing contact with the workpiece sheet.

Referring now specifically to FIGS. 5 and 5A, the cup 106 includes a rubber seal 108 which is located to contact the workpiece sheet 16 so as to trap dust and other cutting debris. Additionally, the rubber seal 108 acts as a gripping medium while the tool is in operation. A plurality of teeth 110 are located at the end of the blades 28. In one example, the rubber seal 108 is triangle-shaped.

Figure 6A:
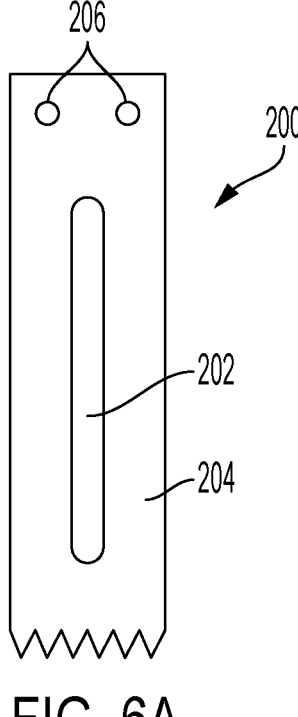
FIG. 6A is a front view of an alternative embodiment of a blade.
Figure 6B:
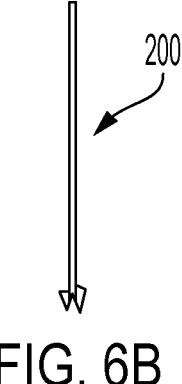
FIG. 6B is a side view of the blade of FIG. 6A.

Referring now to FIGS. 6A and 6B, an alternative embodiment of a blade is shown generally at 200. The blade 200 includes a centrally located, semi-circular, elongate, rectangular opening 202 located therein. The opening 202 permits the blade 200 to bend/form in two directions. While in use, the blade 200 rotates and curves at the same time. We designed the alternative blade embodiment to avoid rigidity and inflexibility in blades that do not include the opening 202. A flat plate 204 includes two holes 206 located therein. The two holes 206 allow the blade 200 to be fixed to the rotator (not shown) and form a fixation point.

Other Embodiments

From the foregoing description, it will be apparent to one of ordinary skill in the art that variations and modifications may be made to the embodiments described herein to adapt it to various usages and conditions.

What is claimed is:

1. A sawing accessory for a drill, comprising:
    a cutting member connected to the drill for axial rotation about an axis of rotation, the cutting member having a plate and at least two blades connected to the plate and depending away therefrom, the blades being inwardly curved towards the axis of rotation; and
    a resilient member interconnecting the blades, the resilient member being connected to the cutting member, the cutting member being configured such that a rotational cutting force being applied to a workpiece sheet creates a curved cut into the sheet, the resilient member is configured such that the blade tips move towards the axis of rotation when the blades cut through the workpiece sheet.

2. The sawing accessory, according to claim 1, in which the resilient member is a W-shaped spring.

3. The sawing accessory, according to claim 1, in the resilient member is configured to reposition the blades during a cutting operation, when the cutting force is applied, and a removal operation, when the cutting member is removed from the workpiece sheet.

4. The sawing accessory, according to claim 1, in which the curved cut is circular hole with sidewalls that are generally frustoconical when viewed in cross section.

5. The sawing accessory, according to claim 4, in which a generally frustoconical- shaped puck is removed from the workpiece sheet, the puck being sized and shaped to be cooperable with the circular hole.

6. The sawing accessory, according to claim 1, in which an elongate shaft connects the cutting member to the drill, the elongate shaft includes a drill bit end and a cutting member end.

7. The sawing accessory, according to claim 1, in which the cutting member includes four blades.

8. The sawing accessory, according to claim 1, in which the cutting member is mounted in a cup, the cup being sized and shaped to collect particulate matter during the cutting step.

9. The sawing accessory, according to claim 1, in which the workpiece sheet is a gyprock sheet, a plywood sheet, an asphalt sheet or a Styrofoam sheet.

10. The sawing accessory, according to claim 9, in which the workpiece sheet is a gyprock sheet or a plywood sheet.

11. The sawing accessory, according to claim 1, in which each blade includes an elongate, centrally located, semi-circular rectangular opening therein.

12. A saw accessory for a drill for cutting a circular hole in a workpiece sheet, the accessory comprising:
    a cutting member connected to the drill for axial rotation about an axis of rotation, the cutting member having a plate and a plurality of blades connected to the plate and depending downwardly therefrom, the blades being inwardly curved towards the axis of rotation;
    a resilient member interconnecting the blades, the resilient member being connected to the cutting member; and
    a cup connected to the drill, the cup being disposed around the cutting member, the cup having a cup sidewall, the cup sidewall being curved inwardly towards the axis of rotation, the cutting member being configured such that a rotational cutting force being applied to the workpiece sheet creates a curved cut into the sheet, the resilient member is configured such that the blade tips move towards the axis of rotation when the blades cut through the workpiece sheet.

13. The saw accessory, according to claim 12, in which the workpiece sheet is a gyprock sheet, a plywood sheet, an asphalt sheet or a Styrofoam sheet.

14. The saw accessory, according to claim 13, in which the workpiece sheet is a gyprock sheet or a plywood sheet.

15. The sawing accessory, according to claim 12, in which each blade includes an elongate, centrally located, semi-circular rectangular opening therein.

16. A saw accessory for a drill for cutting a circular hole in a workpiece sheet, the accessory comprising:

a cutting member connected to the drill for axial rotation about an axis of rotation, the cutting member having a plate and a plurality of blades connected to the plate and depending downwardly therefrom, the blades being inwardly curved towards the axis of rotation;

a resilient member interconnecting the blades, the resilient member being connected to the cutting member, the resilient member is configured such that the blade tips move towards the axis of rotation when the blades cut through the workpiece sheet; and a cup connected to the drill, the cup being disposed around the cutting member, the cup having a cup sidewall, the cup sidewall being curved inwardly towards the axis of rotation, the cutting member being configured such that a rotational cutting force being applied to the workpiece sheet creates a curved cut into the sheet, the cup having a seal located around the cup end to sealingly contact the workpiece sheet to stop dust and particulate material.

17. The sawing accessory, according to claim 16, in which each blade includes an elongate, centrally located, semi-circular rectangular opening therein.

18. The sawing accessory, according to claim 17, in which each blade includes a flat plate having two holes therein.

19. The saw accessory, according to claim 16, in which the workpiece sheet is a gyprock sheet, a plywood sheet, an asphalt sheet or a Styrofoam sheet.

* * * * *